(12) United States Patent
Fujita et al.

(10) Patent No.: US 7,701,655 B2
(45) Date of Patent: Apr. 20, 2010

(54) SERVO SIGNAL RECORDING METHOD, SERVO SIGNAL RECORDING APPARATUS, AND MAGNETIC RECORDING MEDIUM

(75) Inventors: Masao Fujita, Osaka (JP); Kenji Tanaka, Osaka (JP); Seigi Kawarai, Osaka (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 103 days.

(21) Appl. No.: 12/021,030

(22) Filed: Jan. 28, 2008

(65) Prior Publication Data

US 2008/0180834 A1 Jul. 31, 2008

(30) Foreign Application Priority Data

Jan. 29, 2007 (JP) ............... 2007-018325

(51) Int. Cl.
*G11B 5/09* (2006.01)
*G11B 5/584* (2006.01)

(52) U.S. Cl. ...................... 360/49; 360/77.12
(58) Field of Classification Search .................. None
See application file for complete search history.

(56) References Cited

U.S. PATENT DOCUMENTS

| | | | | |
|---|---|---|---|---|
| 4,287,540 A | * | 9/1981 | Cheatham et al. | 360/18 |
| 6,021,013 A | * | 2/2000 | Albrecht et al. | 360/53 |
| 6,970,312 B2 | * | 11/2005 | Yip et al. | 360/48 |
| 7,079,345 B1 | * | 7/2006 | Nguy et al. | 360/66 |
| 7,256,962 B2 | * | 8/2007 | Tateishi | 360/121 |
| 2005/0041324 A1 | | 2/2005 | Tateishi et al. | |
| 2006/0139788 A1 | * | 6/2006 | Yang et al. | 360/75 |

FOREIGN PATENT DOCUMENTS

| | | |
|---|---|---|
| EP | 0 690 442 A2 | 1/1996 |
| JP | 8-30942 A | 2/1996 |
| JP | 2005-63623 A | 3/2005 |

* cited by examiner

*Primary Examiner*—K. Wong
(74) *Attorney, Agent, or Firm*—Birch, Stewart, Kolasch & Birch, LLP

(57) ABSTRACT

The present invention is a servo signal recording method for recording a servo signal on a magnetic tape having a data band and a servo band, wherein erasure is performed based on a pulse having a duty ratio varied so that a driving time of the AC erasing head with respect to one polarity is longer than a driving time thereof with respect to the other polarity, and then, the servo band is magnetized so as to have a magnetization direction opposite to magnetization direction caused by the erasure to record a servo signal in the servo band. According to this configuration, the influence of an information recording signal recorded on the surface of a magnetic recording medium on a reproduction output is reduced, whereby the reproduction output of a servo signal can be enhanced easily.

7 Claims, 5 Drawing Sheets

SERVO SIGNAL RECORDING METHOD, SERVO SIGNAL RECORDING APPARATUS, AND MAGNETIC RECORDING MEDIUM

BACKGROUND OF THE INVENTION

1. Field of the Invention

The present invention relates to a servo signal recording method for recording a servo signal on a magnetic recording medium having a servo band. The present invention also relates to a servo recording apparatus capable of recording a servo signal on a magnetic recording medium. The present invention also relates to a magnetic recording medium on which a servo signal is recorded by a servo signal recording method or a servo signal recording apparatus.

2. Description of Related Art

A magnetic tape that is a kind of magnetic recording medium finds various applications such as an audio tape, a video tape, and a computer tape. Particularly, in the field of a tape for a data backup in a computer, tapes with a storage capacity of hundreds of gigabytes per volume have been commercialized along with the increase in capacity of a hard disk in which a backup is to be created. In the future, the increase in capacity of a backup tape is indispensable for dealing with the further increase in capacity of a hard disk. Along with the increase in capacity, there is a demand for high-density recording. For this purpose, a magnetic layer is reduced in thickness, which may decrease the output level of a servo signal.

Conventionally, there is a method for substantially doubling the output level of a servo signal by DC(direct current)-erasig a magnetic tape before recording a servo signal on the magnetic tape so as to enhance the output level of a servo signal (see JP 8(1996)-30942 A). According to this method, if the magnetic tape is magnetized (DC-erased) with one polarity, a servo pattern during recording of a servo signal is composed of magnetic flux transition between magnetization areas with opposite polarities. FIG. 6(a) shows characteristics of a servo signal read from an AC(alternating current)-erased magnetic tape. FIG. 6(b) shows characteristics of a servo signal read from a DC-erased magnetic tape. As shown in FIG. 6(b), the amplitude of the servo signal read from the DC-erased magnetic tape is about twice (2Vo) the amplitude Vo of the servo signal shown in FIG. 6(a).

Furthermore, JP 2005-63623 A discloses a method for controlling DC erasure by providing a DC erasing head with an azimuth, and controlling the output level of a servo signal by operating a DC component.

However, according to the method disclosed by JP 8(1996)-30942 A, there is a problem that the output level of a servo signal cannot be controlled since the output level of a servo signal is fixed at 2Vo. For example, according to a linear tape open (LTO) specification, a signal output level capable of being reproduced for each recording and reproducing apparatus is determined as a specification, which may cause the following possibility: when the reproduction output level of a servo signal is too high, a magnetic head is saturated, and when the reproduction output level of a servo signal is too low, a signal/noise (S/N) ratio of the servo signal cannot be taken, and in any case, a servo signal cannot be reproduced normally. Thus, although it is necessary to control the output level of a servo signal in accordance with the specification, the output level of a servo signal cannot be controlled by the method of JP8(1996)-30942 A, so that a servo signal may not be reproduced normally.

Furthermore, according to the configuration disclosed by JP 8(1996)-30942 A, since a data track as well as a servo track are DC-erased, there is a problem that the S/N ratio of data recorded on the data track may be decreased.

Furthermore, according to the method disclosed by JP 2005-63623 A, the configuration of rotating a DC erasing head is required, which causes a problem that a servo signal recording apparatus is enlarged.

SUMMARY OF THE INVENTION

Therefore, with the foregoing in mind, it is an object of the present invention to provide a servo signal recording method for reducing the influence on the reproduction output of an information recording signal recorded on the surface of a magnetic recording medium, and easily enhancing the reproduction output of a servo signal. It is another object of the present invention to provide a servo signal recording apparatus suitable for such a servo signal recording method, and a magnetic recording medium.

A servo signal recording method of the present invention is a method for recording a servo signal on a magnetic recording medium having a data band and a servo band, wherein erasure is performed based on a pulse having a duty ratio varied so that a driving time of the AC erasing head with respect to one polarity is longer than a driving time thereof with respect to the other polarity; and a servo signal is recorded in the servo band so that magnetization is formed in a direction opposite to a direction of residual magnetization caused by the erasure based on a pulse in which the driving time is longer.

Furthermore, a servo signal recording apparatus of the present invention is a method for recording a servo signal on a magnetic recording medium having a data band and a servo band. The apparatus includes: an AC erasing head that AC-erases information recorded on a magnetic layer of the magnetic recording medium; a pulse generating portion that generates a pulse for operating the AC erasing head; and a servo signal recording head that records a servo signal in the servo band of the magnetic recording medium that is AC-erased by the AC erasing head, wherein the pulse generating portion generates a pulse having a duty ratio so that a driving time of the AC erasing head with respect to one polarity is longer than a driving time thereof with respect to the other polarity.

Furthermore, a magnetic recording medium of the present invention has at least a servo band, wherein the servo band is erased with a magnetic field in which a driving time of an AC erasing head with respect to one polarity is longer than a driving time thereof with respect to the other polarity, and a servo pattern having a magnetization direction in a direction opposite to the polarity in which the driving time is longer is formed.

According to the present invention, the reproduction output level of a servo signal recorded in a servo band can be enhanced without reducing the S/N ratio of a signal recorded in a data area.

Furthermore, a configuration capable of varying the reproduction output level of a servo signal can be realized with a simple configuration.

DETAILED DESCRIPTION OF THE INVENTION

In the servo signal recording apparatus of the present invention, the pulse generating portion may be capable of varying a duty ratio of a pulse. According to this configuration, the reproduction output level of a servo signal can be controlled to an arbitrary level.

Furthermore, the AC erasing head may be composed of a head capable of AC-erasing the servo band. According to this configuration, the decrease in an S/N ratio of a data signal to be recorded on a magnetic recording medium can be suppressed by AC-erasing only a servo band.

Furthermore, the AC erasing head and the servo signal recording head may be composed of an integrated unit. According to this configuration, commonality can be achieved between the pulse generating portion that outputs a pulse to an AC erasing head and a pulse generating portion that outputs a pulse to a servo signal recording head, whereby a circuit configuration can be simplified and an apparatus can be miniaturized.

Embodiment 1

[1. Configuration and Operation of a Servo Signal Recording Apparatus]

Figure 1:
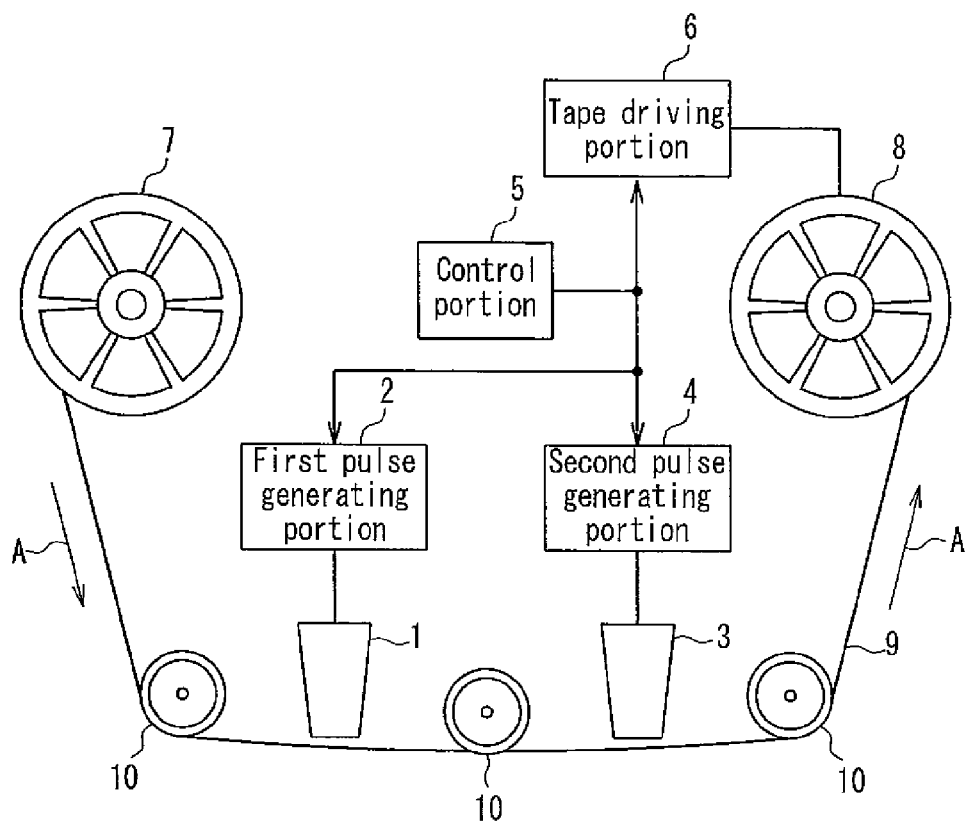
FIG. 1 is a block diagram showing a configuration of a servo signal recording apparatus in Embodiment 1.

FIG. 1 is a schematic view of a servo signal recording apparatus according to Embodiment 1. As shown in FIG. 1, the servo signal recording apparatus includes an AC erasing head 1, a first pulse generating portion 2, a servo write head 3, a second pulse generating portion 4, a control portion 5, a tape driving portion 6, a first reel 7, a second reel 8, and guide rollers 10.

The AC erasing head 1 is operated based on a pulse generated by the first pulse generating portion 2 to AC-erase a magnetic layer of a magnetic tape 9. The AC erasing head 1 is an example of the AC erasing unit.

The first pulse generating portion 2 generates a pulse for operating the AC erasing head 1 by the control from the control portion 5. The pulse generated by the first pulse generating portion 2 has a predetermined duty ratio, and the duty ratio can be set to be an arbitrary value in the present embodiment.

The servo write head 3 is operated based on a pulse generated by the second pulse generating portion 4, and magnetically records a servo signal in a servo band in the magnetic tape 9. The servo write head 3 is an example of the servo signal recording unit.

The second pulse generating portion 4 generates a pulse for performing a recording operation of a servo signal in the servo write head 3 by the control from the control portion 5.

The control portion 5 controls the operations of the first pulse generating portion 2, the second pulse generating portion 4, and the tape driving portion 6, respectively. Specifically, when a servo signal is written on the magnetic tape 9, the control portion 5 outputs an instruction of erasing information recorded on the magnetic tape 9 with respect to the first pulse generating portion 2, outputs an instruction of recording a servo signal with respect to the second pulse generating portion 4, and outputs an instruction of rotating the second reel 8 with respect to the tape driving portion 6.

The tape driving portion 6 rotates the second reel 8 based on the control from the control portion 5. The magnetic tape 9 is allowed to run in a direction represented by an arrow A by rotating the second reel 8.

One end side and the other end side of the magnetic tape 9 respectively are wound around the first reel 7 and the second reel 8. When the second reel 8 is rotated by the tape driving portion 6, the magnetic tape 9 sent out from the first reel 7 is wound around the second reel 8. The tape driving portion 6, the first reel 7, and the second reel 8 are examples of the transportation unit.

The guide rollers 10 are placed rotatably on respective tape input sides and tape output sides of the AC erasing head 1 and the servo write head 3. The guide rollers 10 regulate the position of the magnetic tape 9 so that the magnetic tape 9 runs on a sliding surface of each head.

Next, the operation of the above servo signal recording apparatus will be described.

When a servo signal is recorded on the magnetic tape 9, the magnetic tape 9 first is allowed to run in the direction represented by the arrow A. In the magnetic tape 9 unwound from the first reel 7, the magnetic layer is AC-erased by the AC erasing head 1. Specifically, the AC erasing head 1 performs an operation based on a pulse with a predetermined duty ratio generated by the first pulse generating portion 2, and magnetizes the magnetic layer of the magnetic tape 9 in a predetermined magnetization direction.

Next, a servo signal is recorded on the magnetic tape 9, which has been AC-erased by the AC erasing head 1, by the servo write head 3. The servo write head 3 magnetizes a servo band on the magnetic tape 9 with a magnetization force in a direction opposite to the magnetization direction in which the duty ratio of the AC erasing head 1 is larger, and records a servo signal. The magnetic tape 9 with a servo signal recorded thereon is wound around the winding reel 8.

[2. Operation of AC Erasure]

Next, an AC erasing operation by the AC erasing head 1 will be described.

Figure 2:
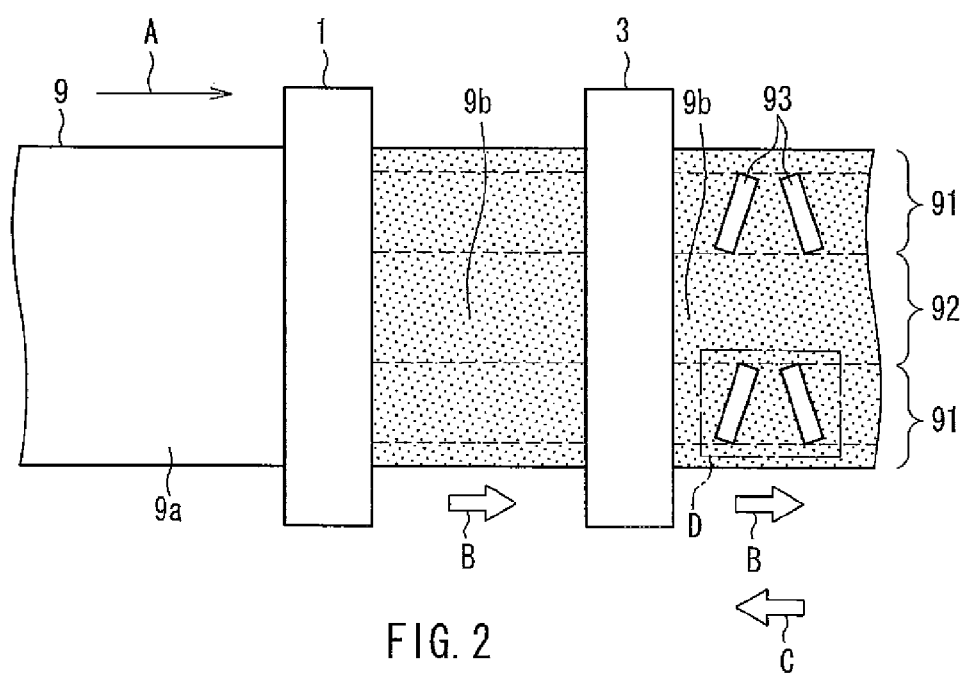
FIG. 2 is a schematic view illustrating an AC erasing operation and a servo signal recording operation.

FIG. 2 is a schematic view of the magnetic tape 9 illustrating an AC erasing operation by the AC erasing head 1 and a recording operation of recording a servo signal by the servo write head 3. As shown in FIG. 2, on the magnetic tape 9, a servo band 91 on which a servo signal is recorded and a data band 92 on which data is recorded are formed in a longitudinal direction. An area 9a is an area that has been AC-erased based on a pulse with a duty ratio of 50:50 and has zero residual magnetization. The area 9a may be DC-erased, or may be neither AC-erased nor DC-erased. Furthermore, an area 9b is an area that has been AC-erased by setting the duty ratio so that one polarity is larger by the AC erasing head 1, and an arrow B is a magnetization direction with a larger duty ratio. Furthermore, a servo pattern 93 in a substantially chevron shape formed in the servo band 91 is magnetized in a direction represented by an arrow C.

As shown in FIG. 2, the magnetic tape 9 (area 9a) that has been AC-erased previously is first AC-erased by the AC erasing head 1. The AC erasing head 1 is operated based on a pulse output from the first pulse generating portion 2. In the present embodiment, the duty ratio of a pulse output from the first pulse generating portion 2 can be set to be an arbitrary value.

FIG. 3(a) shows an example of a pulse output from the first pulse generating portion 2. FIG. 3(b) shows a change in a magnetic flux direction in the AC erasing head 1 that is operated based on a pulse shown in FIG. 3(a). As shown in FIG. 3(a), by setting the duty ratio D1:D2 of the pulse output from the first pulse generating portion 2 to be 80:20, for example, the direction of a magnetic flux of the AC erasing head 1 changes with a period based on the above duty ratio as shown in FIG. 3(b). Thus, in the magnetic tape 9, the arrow B in FIG. 2 represents a magnetization direction in which a duty ratio is larger (D1=80). At this time, the AC erasing head 1 AC-erases the entire area in a tape width direction including the servo band 91 and the data band 92.

Next, in the magnetic tape 9, a servo pattern 93 is formed in a servo band 91 by the servo write head 3.

Figure 3:
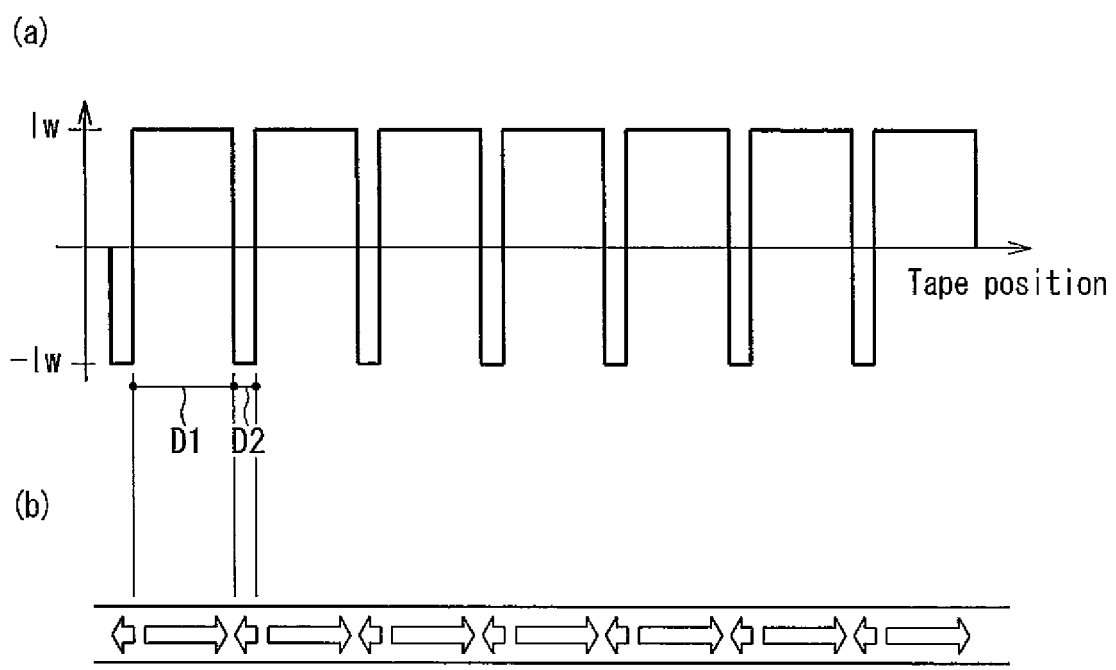
FIG. 3(a) is a timing diagram of a pulse generated by a first pulse generating portion.
FIG. 3(b) is a schematic view showing a magnetic flux direction of an AC erasing head based on a pulse generated by the first pulse generating portion.
Figure 4:
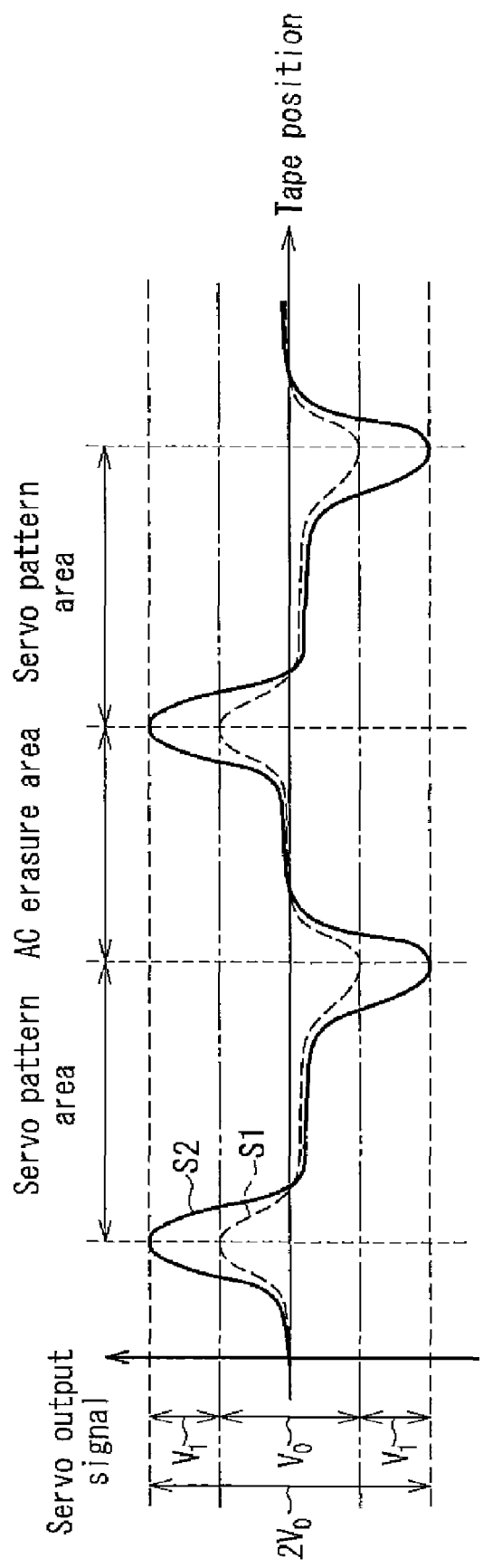
FIG. 4 is a characteristic view showing a reproduction output level of a servo signal.

FIG. 4 shows a change in a reproduction output level of a servo signal in a range D in FIG. 3. When AC erasure is performed setting the duty ratio of a pulse generated by the first pulse generating portion 2 to be 50:50 (residual magnetization:zero) to record a servo signal, the reproduction output level of a servo signal changes as in characteristics S1 in FIG. 4. Furthermore, when AC erasure is performed setting the duty ratio of a pulse generated by the first pulse generating portion 2 to be 100:0 (DC erasure) to record a servo signal, the reproduction output level of a servo signal changes as in characteristics S2 in FIG. 4. Thus, by setting the duty ratio D1:D2 of a pulse generated by the first pulse generating portion 2 to be an arbitrary value in a range of 50:50 to 100:0, the reproduction output level of a servo signal can be set to be an arbitrary value in the range of V1 in FIG. 4.

The duty ratio of the pulse generated by the first pulse generating portion 2 is controlled variably based on the instruction from the control portion 5. Specifically, the control portion 5 controls the duty ratio of a pulse generated by the first pulse generating portion 2 so that the reproduction output level of a servo signal falls in a range of the specification of the recording and reproducing apparatus.

In the above description, although the duty ratio D1:D2 of a pulse is 80:20, the duty ratio D1:D2 may be another value. The inventors of the present invention performed AC erasure based on a pulse having a duty ratio of 95:5 with respect to a magnetic tape in conformity with the LTO3 standard manufactured by Hitachi Maxell, Ltd., recorded a servo signal, reproduced the recorded servo signal, and measured a reproduction output level. Consequently, it was found that a servo signal with a reproduction output level of 86% is obtained when the reproduction output level of a servo signal having a duty ratio of 100:0 (DC erasure) is set to be 100%. More specifically, in order to obtain a reproduction output level of 86%, the duty ratio of a pulse generated by the first pulse generating portion 2 may be set to be 95:5.

Furthermore, by setting the duty ratio D1:D2 of a pulse generated by the first pulse generating portion 2 to be an arbitrary value in a range of 50:50 to 100:0, the magnetization direction with a larger duty ratio is a direction represented by the arrow B in FIG. 2, and the reproduction output level of a servo signal can be set to be an arbitrary value. This is effective in the case where the magnetization direction of the servo pattern 93 is a direction represented by an arrow C.

[3. Effects of Embodiments, Etc.]

According to the present embodiment, at least the servo band 91 is erased so as to have a magnetization direction with a larger duty ratio in a direction opposite to the magnetization direction of the servo pattern 93, and then, a servo signal is recorded, whereby the reproduction output level of the servo signal can be enhanced.

Furthermore, by making the duty ratio of a pulse output from the first pulse generating portion 2 that operates the AC erasing head 1 variable, the reproduction output level of the servo signal can be controlled to be an arbitrary value. Thus, the reproduction output level of the servo signal can be controlled so as to fall in a range of the specification determined for each recording and reproducing apparatus, and a servo signal capable of being reproduced normally in the recording and reproducing apparatus can be recorded. Furthermore, a servo signal can be recorded so as to have an optimum reproduction output level for each manufacturer of the recording and reproducing apparatus and each type thereof.

Furthermore, the reproduction output level of a servo signal can be controlled merely by changing the duty ratio of a pulse output from the first pulse generating portion 2, so that the control can be performed with a simple configuration.

Figure 5:
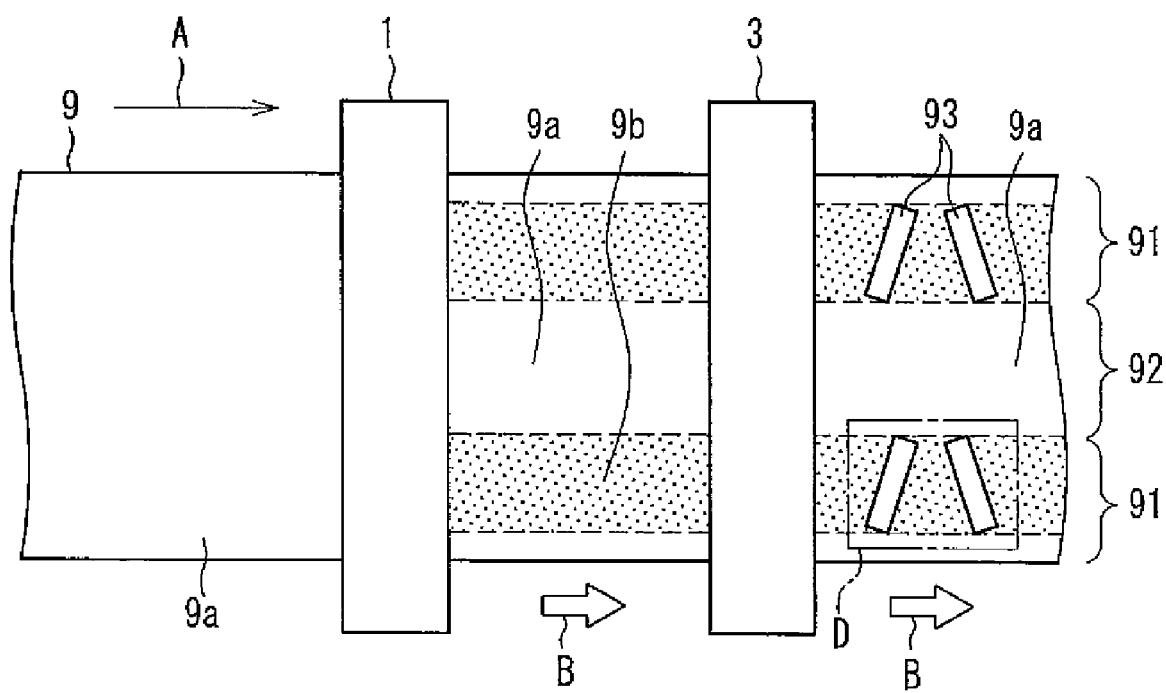
FIG. 5 is a schematic view illustrating an AC erasing operation and a servo signal recording operation in Embodiment 1.
Figure 6:
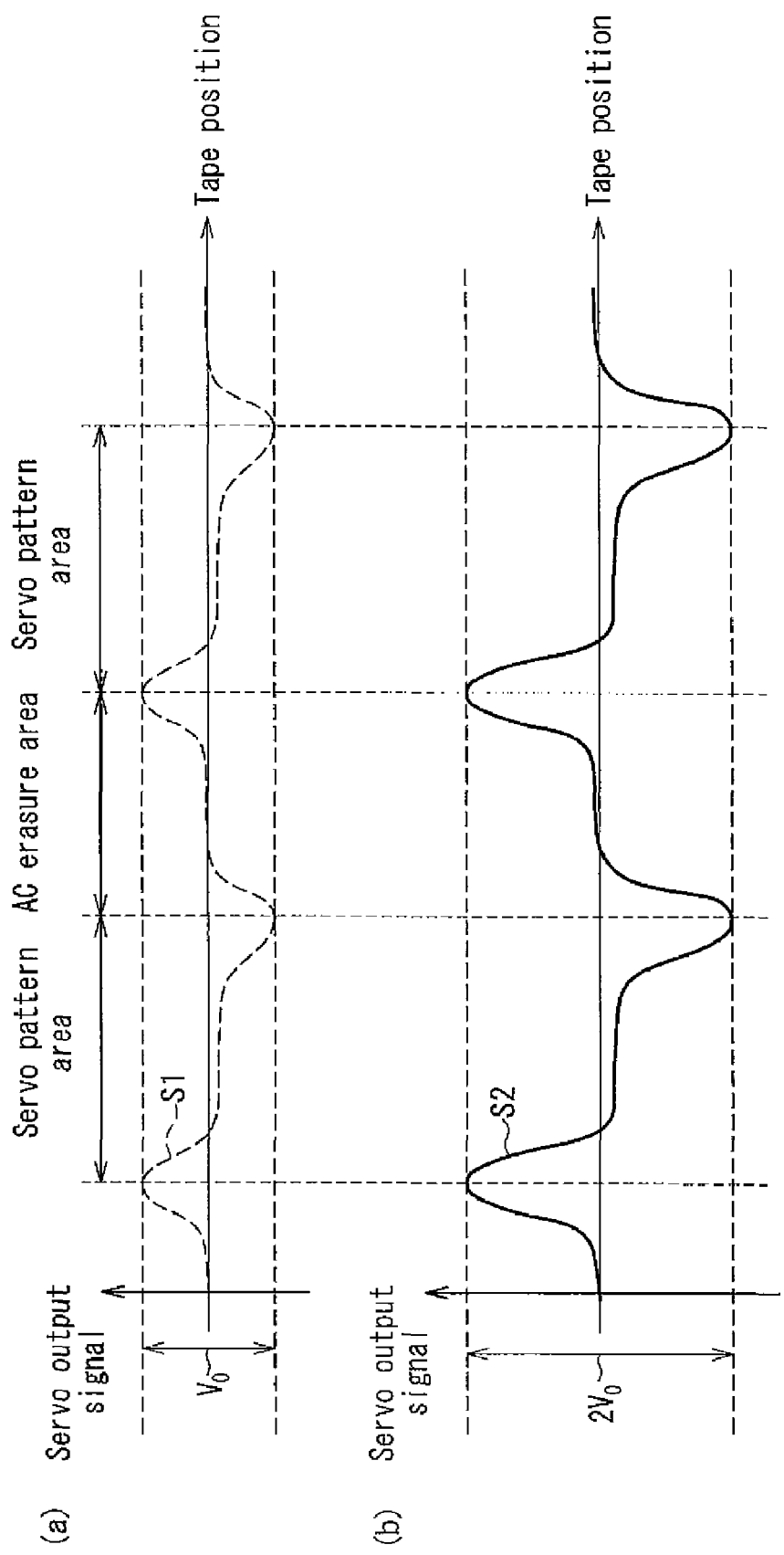
FIG. 6(a) is a characteristics view showing a reproduction output level of a servo signal at a time of AC erasure with a pulse having a duty ratio of 50:50.
FIG. 6(b) is a characteristic view showing a reproduction output level of a servo signal at a time of DC erasure.

In the configuration shown in FIG. 2, although the entire area in the width direction of the magnetic tape 9 is AC-erased by the AC erasing head 1, similar effects are obtained even with the configuration of AC-erasing only the servo band 91. FIG. 5 shows a state in which a servo signal is recorded on a magnetic tape in which only the servo band 91 is AC-erased by the AC erasing head 1.

Furthermore, in the present embodiment, the AC erasing head 1 and the servo write head 3 can be integrated with each other. According to this configuration, commonality can be achieved between the first pulse generating portion 2 and the second pulse generating portion 4, which can simplify a circuit configuration and miniaturize an apparatus.

A head tracking servo method of the present invention is useful for a data storage system for a computer using a magnetic tape as an information medium.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A servo signal recording method for recording a servo signal on a magnetic recording medium having a data band and a servo band,
   wherein erasure is performed based on a pulse having a duty ratio varied so that a driving time of the AC erasing head with respect to one polarity is longer than a driving time thereof with respect to the other polarity; and
   a servo signal is recorded in the servo band so that magnetization is formed in a direction opposite to a direction of residual magnetization caused by the erasure based on a pulse in which the driving time is longer.

2. A servo signal recording apparatus for recording a servo signal on a magnetic recording medium having a data band and a servo band, comprising:
   an AC erasing head that AC-erases information recorded on a magnetic layer of the magnetic recording medium;
   a pulse generating portion that generates a pulse for operating the AC erasing head; and
   a servo signal recording head that records a servo signal in the servo band of the magnetic recording medium that is AC-erased by the AC erasing head,
   wherein the pulse generating portion generates a pulse having a duty ratio so that a driving time of the AC erasing head with respect to one polarity is longer than a driving time thereof with respect to the other polarity, and
   the servo signal recording head records a servo signal in the servo band so that magnetization is formed in a direction opposite to a direction of residual magnetization caused by the erasure based on a pulse in which the driving time is longer.

3. The servo signal recording apparatus according to claim 2, wherein the pulse generating portion is capable of varying a duty ratio of a pulse.

4. The servo signal recording apparatus according to claim 1, wherein the AC erasing head is composed of a head capable of AC-erasing the servo band.

5. The servo signal recording apparatus according to claim 2, wherein the AC erasing head is composed of a head capable of AC-erasing the servo band.

6. The servo signal recording apparatus according to claim 5, wherein the AC erasing head and the servo signal recording head are composed of an integrated unit.

7. A magnetic recording medium having a data band and a servo band,
wherein the servo band is erased with a magnetic field in which a driving time of an AC erasing head with respect to one polarity is longer than a driving time thereof with respect to the other polarity, and a servo pattern having a magnetization direction in a direction opposite to the polarity in which the driving time is longer is formed.

* * * * *